United States Patent
Asano et al.

(10) Patent No.: US 6,350,801 B1
(45) Date of Patent: Feb. 26, 2002

(54) FILLED GRANULAR POLYTETRAFLUOROETHYLENE POWDER

(75) Inventors: Michio Asano; Masamichi Sukegawa, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/403,596

(22) PCT Filed: Apr. 15, 1998

(86) PCT No.: PCT/JP98/01789

§ 371 Date: Oct. 22, 1999

§ 102(e) Date: Oct. 22, 1999

(87) PCT Pub. No.: WO98/47949

PCT Pub. Date: Oct. 29, 1998

(30) Foreign Application Priority Data

Apr. 22, 1997 (JP) ............................................. 9-120180

(51) Int. Cl.⁷ ................................................. C08K 3/40
(52) U.S. Cl. ....................................... 524/377; 524/494
(58) Field of Search ................................ 524/366, 377, 524/494

(56) References Cited

U.S. PATENT DOCUMENTS

| | | | |
|---|---|---|---|
| 3,674,736 A | 7/1972 | Lerman et al. | |
| 3,766,133 A | 10/1973 | Roberts | |
| 3,915,916 A | 10/1975 | Leverett | |
| 4,370,436 A | 1/1983 | Nakamura et al. | |

FOREIGN PATENT DOCUMENTS

| | | |
|---|---|---|
| JP | 54-17782 | 7/1979 |
| JP | 3-255133 | 11/1991 |
| JP | 4-309548 | 11/1992 |
| JP | 6-73189 | 3/1994 |
| JP | 8-208929 | 8/1996 |
| WO | WO97/11111 | 9/1996 |

*Primary Examiner*—Christopher Henderson
(74) *Attorney, Agent, or Firm*—Armstrong, Westerman, Hattori, McLeland & Naughton, LLP

(57) ABSTRACT

To provide a filler-containing PTFE granular powder, which has a large apparent density, a small average particle size, a narrow particle size distribution, a superior powder flowability and a small electrostatic charge, and gives a molded product having a superior tensile strength and elongation, a lower surface roughness and a high whiteness, and a process for preparing the same. The granular powder is prepared by forming a PTFE powder and a filler into an aqueous slurry by using an organic liquid forming liquid-liquid interface with water and a nonionic surfactant having a hydrophobic segment and a hydrophilic segment, and then granulating in combination of stirring and deagglomerating.

11 Claims, 7 Drawing Sheets

FILLED GRANULAR POLYTETRAFLUOROETHYLENE POWDER

TECHNICAL FIELD

The present invention relates to a filler-containing polytetrafluoroethylene granular powder and a preparation process thereof.

BACKGROUND ART

Hitherto, a process for preparing a filler-containing polytetrafluoroethylene (PTFE) granular powder by granulating a mixture of a filler and a PTFE powder with stirring in water was proposed, for example, in JP-B-43-8611, JP-B-44-22619, JP-B-48-37576, JP-B-49-17855, JP-B-56-8044, JP-B-57-18730, etc.

However, by the process for preparation disclosed in each of the above-mentioned patent publications, a filler-containing PTFE granular powder having a small particle size and a narrow particle size distribution could not be obtained.

For that reason, in case of preparing, for example, small articles such as seal rings in the form of a rubber band, thin moldings and molded products having a small surface roughness, there was a problem that complicated and uneconomical steps must be employed, such as step of sieving a filler-containing PTFE granular powder to take out only particles of small size and molding them, or step of cutting the obtained molding.

Also a granular powder having excellent powder flowability cannot be obtained only by pulverizing a filler-containing PTFE granular powder.

In JP-B-60-21694, there was proposed a process for preparing a filler-containing PTFE granular powder by granulating, with stirring in water, a PTFE powder and a filler which has been previously surface-treated with an aminosilane compound in coexistence with a water-insoluble organic liquid and an anionic surfactant. However, an apparent density of the filler-containing PTFE granular powder and tensile strength of molded products obtained therefrom are not fully satisfactory.

Further in the above-mentioned preparation process, there were problems that long steps are employed, a complicated step of pre-mixing the filler and the PTFE powder is necessary and cost is high.

The present inventors have made intensive studies in view of the above-mentioned problems, and as a result, have found that those problems can be solved by mixing the PTFE powder and the filler in water in the state of slurry in the presence of a surfactant and further granulating the mixture with stirring in the presence of an organic liquid which forms liquid-liquid interface with water.

The present inventors have made further studies in order to obtain a granular powder more excellent in powder characteristics and physical properties in the above-mentioned granulation process (hereinafter also referred to as "slurry granulation process"), and have found that when a specific nonionic surfactant is used, an obtained granular powder has a low electrostatic charge and can give molded articles having a high whiteness (Z value).

Namely an object of the present invention is to provide a filler-containing PTFE granular powder having a good processability and a process for preparation thereof. Particularly an object of the present invention is to provide a filler-containing PTFE granular powder which has a large apparent density, a small average particle size, a narrow particle size distribution, a small electrostatic charge and good physical properties such as powder flowability, and gives molded products having excellent physical properties such as elongation and a high whiteness, and a process for preparation thereof.

DISCLOSURE OF THE INVENTION

The present invention relates to a process for preparing a filler-containing polytetrafluoroethylene granular powder by granulation, in water with stirring, of a polytetrafluoroethylene powder prepared by suspension polymerization and a filler; characterized in that the powder and filler are poured in water separately without being pre-mixed, are mixed with stirring in the presence of a nonionic surfactant having a hydrophobic segment comprising a poly(oxyalkylene) unit having 3 or 4 carbon atoms and a hydrophilic segment comprising a poly(oxyethylene) unit to give a slurry, and then are granulated with stirring in the presence of an organic liquid which forms liquid-liquid interface with water.

The present invention also relates to a process for preparing a filler-containing polytetrafluoroethylene granular powder by granulation, in water with stirring, of a polytetrafluoroethylene powder prepared by suspension polymerization and a filler; characterized in that the powder is poured in water and stirred in the presence of a nonionic surfactant having a hydrophobic segment comprising a poly(oxyalkylene) unit having 3 or 4 carbon atoms and a hydrophilic segment comprising a poly(oxyethylene) unit to give a slurry, and then after the filler is added and mixed to the slurry, the mixture is granulated with stirring in the presence of an organic liquid which forms liquid-liquid interface with water.

Further the present invention relates to a process for preparing a filler-containing polytetrafluoroethylene granular powder by granulation, in water with stirring, of a polytetrafluoroethylene powder prepared by suspension polymerization and a filler; characterized in that a water-containing powder of polytetrafluoroethylene after suspension-polymerized is wet-pulverized without being subjected to drying, poured in water, and stirred in the presence of a nonionic surfactant having a hydrophobic segment comprising a poly(oxyalkylene) unit having 3 or 4 carbon atoms and a hydrophilic segment comprising a poly(oxyethylene) unit to give a slurry, and then after the filler is added and mixed to the slurry, the mixture is granulated with stirring in the presence of an organic liquid which forms liquid-liquid interface with water.

Further the present invention relates to a process for preparing a filler-containing polytetrafluoroethylene granular powder; characterized in that in each of the above-mentioned preparation processes, the granulation with stirring is carried out in combination use of stirring and deagglomeration by using means for deagglomerating a granular powder obtained by the granulation in addition to means for stirring.

The present invention also relates to a filler-containing PTFE granular powder prepared by any of the above-mentioned processes which is characterized in that an apparent density of the filler-containing PTFE granular powder is not less than 0.7 g/cm$^3$, a flowability (defined hereinafter) of the granular powder is not less than 6 times and an electrostatic charge is not more than 50 V or that an angle of repose is not more than 40 degrees in case of an apparent density of not less than 0.7 g/cm$^3$ and less than 0.9 g/cm$^3$, not more than 38 degrees in case of an apparent density of not less than 0.9 g/cm³ and less than 1.0 g/cm³, and not more than 36 degrees in case of an apparent density of not less than 1.0 g/cm³, and an average particle size is not more than 500 μm and an electrostatic charge is not more than 50 V.

BEST MODE FOR CARRYING OUT THE INVENTION

Figure 1:
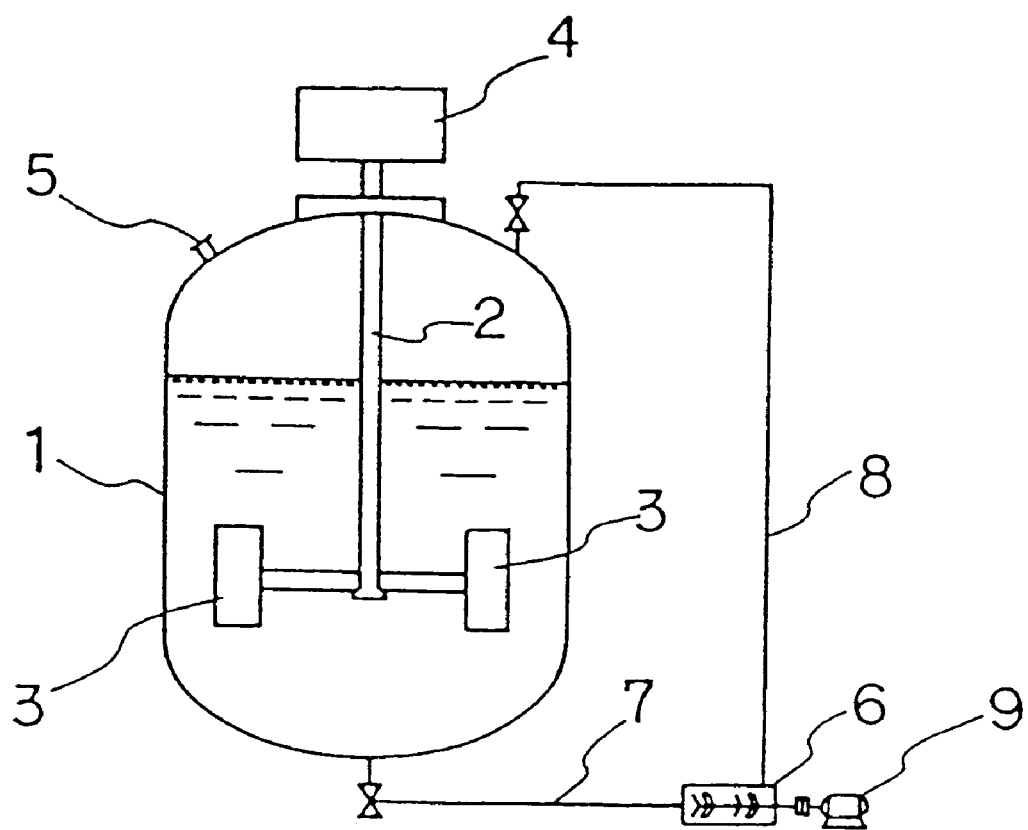
FIG. 1 is a diagrammatic cross-sectional view of a granulator usable in the preparation process of the present invention.

A major feature of the preparation process of the present invention is to mix a PTFE powder (including a water-containing PTFE powder unless otherwise noted hereinafter) and a filler with stirring in water in the state of slurry in the presence of a nonionic surfactant having a hydrophobic segment comprising a poly(oxyalkylene) unit having 3 or 4 carbon atoms and a hydrophilic segment comprising a poly(oxyethylene) unit (hereinafter may be referred to as "specific nonionic surfactant"), and thus, for example, no complicated step of pre-mixing the PTFE powder and the filler like a conventional process is required.

Namely the preparation processes of the present invention are (1) a process for preparing a filler-containing polytetrafluoroethylene granular powder by granulation, in water with stirring, of a polytetrafluoroethylene powder prepared by suspension polymerization and a filler; characterized in that the powder and filler are poured in water separately without being pre-mixed, are mixed with stirring in the presence of a specific nonionic surfactant to give a slurry, and then are granulated with stirring in the presence of an organic liquid which forms liquid-liquid interface with water (hereinafter referred to as "Preparation Process (1)"), (2) a process for preparing a filler-containing polytetrafluoroethylene granular powder by granulation, in water with stirring, of a polytetrafluoroethylene powder prepared by suspension polymerization and a filler; characterized in that the powder is poured in water and stirred in the presence of a specific nonionic surfactant to give a slurry, and then after the filler is added and mixed to the slurry, the mixture is granulated with stirring in the presence of an organic liquid which forms liquid-liquid interface with water (hereinafter referred to as "Preparation Process (2)"), and (3) a process for preparing a filler-containing polytetrafluoroethylene granular powder by granulation, in water with stirring, of a polytetrafluoroethylene powder prepared by suspension polymerization and a filler; characterized in that a water-containing powder of polytetrafluoroethylene is wet-pulverized without being subjected to drying, poured in water, stirred in the presence of a specific nonionic surfactant to give a slurry, and then after the filler is added and mixed to the slurry, the mixture is granulated with stirring in the presence of an organic liquid which forms liquid-liquid interface with water (hereinafter may be referred to as "Preparation Process (3)").

In the above-mentioned Preparation Process (1), it is not necessary to pre-mix the PTFE powder and the filler, and as a method of pouring them in water, there are, for example, a method of pouring the PTFE powder previously, a method of pouring the filler previously and a method of pouring them simultaneously.

In the Preparation Process (1), by pouring the PTFE powder and filler in water, adding a specific nonionic surfactant and then stirring, the PTFE powder and the filler get wet with water and continuation of the stirring results in the state of a uniform mixture of the PTFE powder, filler and water, namely, in the state of slurry which is usually a viscous mixture having a viscosity of from 10 to 1,000 cps.

After the mixture became in the state of slurry, though by adding the organic liquid forming liquid-liquid interface with water and then stirring, the granulation is started in the droplets of the organic liquid, the droplets can maintain the state of being smaller and more approximate to a spherical form because of functioning of the specific nonionic surfactant already being present therein.

In the above-mentioned Preparation Process (2), by pouring the PTFE powder in water and then adding a specific nonionic surfactant thereto, the PTFE powder gets wet with water and by stirring, a uniform mixture with water in the state of slurry is obtained. Further by adding the filler and then stirring, a uniform mixture of the PTFE powder, filler and water (a viscous mixture having a viscosity of 10 to 1,000 cps) can be prepared.

After adding the filler, the slurry granulation may be carried out in the same manner as in Preparation Process (1).

In the above-mentioned Preparation Process (3), as described below, by wet-pulverizing the water-containing PTFE powder without being subjected to drying, pouring the wet-pulverized PTFE powder in water and then adding the specific nonionic surfactant and starting the granulation, the mixture becomes in the state of slurry. Then by adding the filler in the same manner as in Preparation Process (2), the PTFE powder and filler are mixed uniformly.

After adding the filler, the slurry granulation may be carried out in the same manner as in Preparation Process (1).

In the preparation processes of the present invention, a specific nonionic surfactant may be added to water previously.

The PTFE powder used in the present invention is prepared by usual suspension polymerization, and preferable is, for example, a powder comprising homopolymer of tetrafluoroethylene (TFE) or a copolymer of TFE and a monomer copolymerizable with TFE. An average particle size after the pulverization is not larger than 200 μm, preferably not larger than 50 μm, and a lower limit thereof is defined by a pulverizing apparatus and pulverizing technique. There is a powder having a water content of not more than 0.1% by weight, preferably not more than 0.02% by weight after the drying.

Examples of a pulverizing machine used for the above-mentioned pulverization are for instance, a hammer mill, crusher equipped with a rotor having blades, jet mill and impact mill Also in the present invention, as the PTFE powder, there can be used a water-containing PTFE powder, for example, one having an average particle size of 200 to 1,000 μm and a water content of 5 to 30% by weight and prepared by pre-pulverizing, by means of a pipe line homomixer, coarse PTFE particles having an average particle size of 2 to 3 mm, which were prepared by the same suspension polymerization as in the above-mentioned PTFE powder and taken out of the polymerization system. Then the so-prepared water-containing PTFE powder is poured into the JIYU mill described below and wet-pulverized under the conditions of a motor power of 2.2 kW and a treating capacity of 1.0 to 100 kg/hr by using a screen having plural holes of 0.1 to 0.3 mm diameter as a perforated panel for classification. Thus a powder having an average particle size of 20 to 100 μm and a water content of 5 to 30% by weight can be obtained. When the thus obtained water-containing powder is used, a drying step required for preparing the above-mentioned PTFE powder is not necessary.

As the monomer copolymerizable with TFE, there are, for example, a perfluoro(vinyl ether) represented by the formula (I):

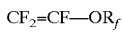

$$CF_2=CF-OR_f \qquad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

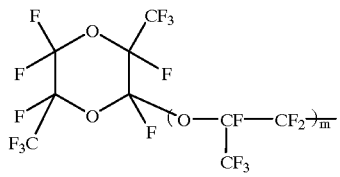

(II)

in which m is 0 or an integer of 1 to 4, or an organic group represented by the formula (III):

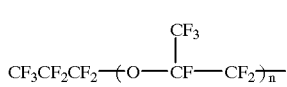

(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an effect of making creep resistance excellent can be obtained with maintaining the property of being not-melt-processable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, an effect of making creep resistance excellent can be obtained.

The use of the above-mentioned PTFE powder particles or water-containing PTFE powder particles having the average particle size in the above-mentioned range gives such effects that the granular powder obtained through granulation is easily handled, that is, having good powder flowability and an excellent apparent density, and in addition, the obtained molded articles have good physical properties.

In the present invention, in case where a hydrophilic filler is used, there is a drawback such that the filler is easily transferred into a liquid phase due to its hydrophilic property and is difficult to be mixed with the PTFE powder homogeneously, that is, the granular powder in which the whole of the filler used is mixed with the PTFE powder cannot be obtained and a part of the filler remains in the treating water. This phenomenon is called the separation of filler.

To cope with that problem, there is employed a method of previously surface-treating a hydrophilic filler for making it hydrophobic to lower its surface activity near the surface activity of the PTFE powder and then stirring in water, or the like method.

As the compound known as one used for the above-mentioned surface treatment, there are (a) a functional amino-containing silane, a phenyl-containing silane, and (or) a soluble silicone (JP-A-51-548, JP-A-51-549, JP-A-4-218534), (b) a monocarboxylic acid of hydrocarbon having 12 to 20 carbon atoms (JP-B-48-37576), (c) a chromium complex compound of an aliphatic carboxylic acid (JP-B-48-37576), (d) a silicone (JP-A-53-139660), etc. and (e) a method of coating a hydrophilic filler with PTFE (JP-A-51-121417) is also known.

Examples of the above-mentioned compound used for the surface treatment of the hydrophilic filler are, for instance, aminosilane coupling agents such as γ-aminopropyltriethoxysilane ($H_2N(CH_2)_3Si(OC_2H_5)_3$), m- or p-aminophenyltriethoxysilane ($H_2N-C_6H_4-Si(OC_2H_5)_3$), γ-ureidopropyltriethoxysilane ($H_2NCONH(CH_2)_3Si(OC_2H_5)_3$, N-(β-aminoethyl)-γ-aminopropyltrimethoxysilane ($H_2N(CH_2)_2NH(CH_2)_3Si(OCH_3)_3$) and N-(β-aminoethyl)-γ-amino-propylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol.

A filler having water-repelling property can be used as it is.

Examples of the above-mentioned filler are, for instance, one or more of metal fibers or metal powders such as glass fiber, graphite powder, bronze powder, gold powder, silver powder, copper powder, stainless steel powder, stainless steel fiber, nickel powder and nickel fiber; inorganic fibers or inorganic powders such as molybdenum disulfide powder, fluorinated mica powder, coke powder, carbon fiber, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber and graphite powder, glass fiber and molybdenum disulfide powder, bronze powder and molybdenum disulfide powder, bronze powder and carbon fiber, graphite powder and coke powder, graphite powder and heat-resistive aromatic resin powder, carbon fiber and heat-resistive aromatic resin powder or the like. The mixing method may be either of wet method or dry method.

The filler-containing PTFE granular powder of the present invention has a PTFE portion having high whiteness, and therefore when a white or transparent filler, for example, glass fiber, boron nitride powder, titanium oxide powder or the like is used, molded articles having a higher whiteness (Z value) as compared with conventional molded articles can be obtained.

It is preferable that an average particle size of the above-mentioned filler is from 10 to 1,000 μm in case of a powder and an average fiber length is from 10 to 1,000 μm in case of a fiber.

With respect to the proportion of the PTFE powder and the filler, it is preferable that the proportion of the filler is 2.5 to 100 parts (parts by weight, hereinafter the same), more preferably 5 to 80 parts on the basis of 100 parts of the PTFE powder.

The organic liquid which is used in the present invention may be an organic liquid capable of forming a liquid-liquid interface with water and being present as droplets in water or may be one which dissolves somewhat in water as far as it is capable of forming droplets in water and a liquid-liquid interface with water. Examples thereof are, for instance, alcohols such as 1-butanol and 1-pentanol; ethers such as diethyl ether and dipropyl ether; ketones such as methyl ethyl ketone and 2-pentanone; aliphatic hydrocarbons such as pentane and dodecane; aromatic hydrocarbons such as benzene, toluene and xylene; halogenated hydrocarbons such as methylene chloride, tetrachloroethylene, trichloroethylene, chloroform, chlorobenzene, trichlorotrifluoroethane, monofluorotrichloromethane, difluorotetrachloroethane, 1,1,1-trichloroethane, 1,1-dichloro-2,2,3,3,3-pentafluoropropane, 1,3-dichloro-1,1,2,2, 3-pentafluoropropane, 1,1-dichloro-2,2,2-trifluoroethane and 1,1-dichloro-1-fluoroethane; and the like. Among them, the halogenated hydrocarbons are preferable, and particularly preferable are chlorinated- and fluorochlorinated-hydrocarbons such as 1,1,1-trichloroethane, 1,1-dichloro-2, 2,3,3,3-pentafluoropropane, 1,3-dichloro- 1,1,2,2,3-pentafluoropropane, 1,1-dichloro-2,2,2-trifluoroethane and 1,1-dichloro-1-fluoroethane. Those are nonflammable and satisfy requirements for flon restrictions. Those organic liquids may be used solely or in combination use of two or more thereof.

An amount of the above-mentioned liquid-liquid interface-forming organic liquid is 30 to 80% (% by weight, hereinafter the same), preferably 40 to 60% on the basis of the total amount of the PTFE powder and filler.

In the present invention, as mentioned above, it appears that the granulation of the filler-containing PTFE powder is conducted in the droplets of the above-mentioned liquid-liquid interface-forming organic liquid and that, since the droplets of the liquid become smaller and more approximate to a spherical form because of functioning of a specific nonionic surfactant, particles having a smaller size and a form near sphere can be obtained, and an apparent density of the granular powder is increased.

The specific nonionic surfactants are segmented polyalkylene glycols having a hydrophobic segment comprising poly(oxyalkylene) unit having 3 or 4 carbon atoms and a hydrophilic segment comprising poly(oxyethylene) unit.

As the segmented polyalkylene glycols having a hydrophobic segment and hydrophilic segment, preferable are, for example, those represented by the formula (IV):

     (IV)

wherein A is

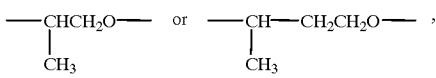

p is an integer of 5 to 200, q is an integer of 2 to 400. From the viewpoint of being easily adsorbed in the PTFE resin, it is preferable that p is from 15 to 40 and q is from 7 to 100. As the commercially available surfactants, there can be used, for example, Puronon #208, Puronon #104 (both are nonionic surfactants available from NOF corporation) and the like.

An adding amount of the above-mentioned specific nonionic surfactant is from 0.01 to 5%, preferably from 0.1 to 0.3% on the basis of the total amount of the PTFE powder and filler.

By using the surfactant in the above-mentioned range, there can be obtained a granular powder being nearly in the spherical form and having a small particle size, a narrow particle size distribution, an excellent powder flowability, a small electrostatic charge and a large apparent density.

In case of a usual nonionic surfactant, when a white filler such as glass, e.g. glass fibers, titanium oxide, titanate and/or boron nitride is used, there is a case where a molded article after sintered is colored, depending on kind of a surfactant used. However when the above-mentioned specific nonionic surfactant is used, a molded article having a high whiteness (Z value) which is not colored can be obtained even if a white filler is used.

In the above-mentioned Preparation Process (3), the wet-pulverizing of the water-containing PTFE powder is carried out by means of a pulverizing machine which is of wet pulverization type and employs an impact force for the pulverization. Though various pulverizing machines of that type are known, in the above-mentioned wet-pulverizing, it is desirable that at the same time as the pulverization, only fine powder pulverized to the desired particle size can be taken out continuously. For that reason, when the pulverizing machine is selected from the types which apply an impact force by a hammer, it is desirable that a peripheral speed of the hammer is as high as possible.

One of the pulverizing machines satisfying such requirements is, for example, "JIYU mill" available from Nara Kikai Seisakusho Kabushiki Kaisha. That pulverizing machine has a pulverizing chamber in the form of a cylinder compressed laterally, and plural rod-like protrusions having a rectangular or elliptical sectional form are provided on the facing two inside walls of the chamber. A disc-like rotor is disposed in parallel with the two inside walls in the center of the pulverizing chamber and equipped with the same rod-like protrusions on its both surfaces, which are arranged not to collide with the rod-like protrusions on the insider walls when the rotor is rotated.

The above-mentioned water-containing PTFE powder is fed to the center of the pulverizing machine and blown off toward the peripheral direction of the rotor by a centrifugal force of the rotating rotor, thus colliding with the rod-like protrusions of the rotor and side walls to be pulverized by an impact force. There is provided a perforated panel in the form of a ring on the periphery in the rotating direction of the rotor. Only the particles pulverized to the size smaller than the perforated holes on the perforated panel pass through the holes and are taken outside the perforated panel. As the perforated panel, there may be used a metal net, a perforated thin metal sheet or various other ones. The diameter of the obtained particles varies depending on the diameter of the perforated holes. The smaller the hole diameter is, the smaller the particle size of the obtained particles is. However, since the particles are wet with water, the diameter of the particles taken out actually becomes fairly smaller than the diameter of the holes perforated on the perforated panel.

It appears that one of the reasons why the powder can be finely pulverized by the above-mentioned JIYU mill even under wet condition is that a high rotational speed of the rotor, that is, a peripheral speed of about 100 m/s can be obtained.

As a hammer type pulverizing machine capable of obtaining a peripheral speed of not less than that of the JIYU mill, there are a "Coloplex" and "Contraplex" available from Hosokawa Mikuron Kabushiki Kaisha, a "Fine Mill" available from Nippon Pneumatic Mfg. Co., Ltd. and the like. Those machines are all suitable for pulverizing under dry condition, and when used under the presence of water, there occur phenomena such that the peripheral speed is decreased and that since pneumatic classification method is used as a classifying mechanism, when the pulverized particles are wet, pneumatic classification does not function and the particles having a diameter larger than desired are classified and discharged. Also basically pulverizing machines of wet-pulverization type, for example, a shearing mill such as a colloid mill or a grinding machine cannot be used because the PTFE powder is subject to decomposition due to an extreme shearing force.

The present invention is also characterized in that the granulation is carried out by combining the stirring and deagglomeration of the powder.

The deagglomeration is carried out by means for partly deagglomerating a granulate which has a proper size and has already been formed as a secondary agglomeration of primary particles to decrease a secondary particle size, for example, a method of stirring with dispersing blades at high speed can be used.

The stirring and deagglomeration may be carried out at the same time or separately.

By the combination of stirring and deagglomeration, an excellent effect of obtaining a granulate having a large apparent density and finely granulated can be exhibited.

A deagglomeration mechanism for powder particles means a mechanism being capable of partly deagglomerating a granulate which has a proper size and has already been formed as a secondary agglomeration of primary particles to decrease a secondary particle size.

Figure 2:
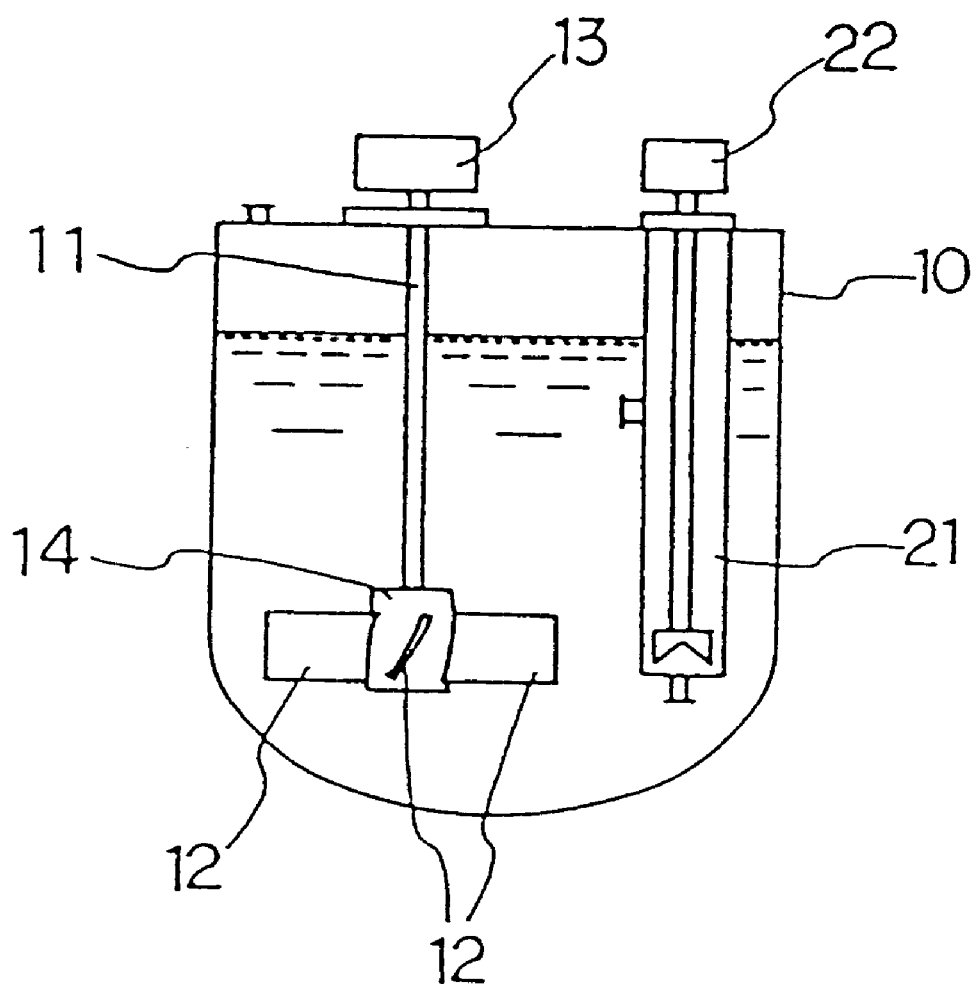
FIG. 2 is a diagrammatic cross-sectional view of another granulator usable in the preparation process of the present invention.

Equipment used for the preparation process of the present invention is then explained by means of figures. FIGS. 1 and 2 are diagrammatic cross-sectional views of equipment used for the preparation process of the present invention. In FIG. 1, numeral 1 represents a stirring tank, in which a rotation shaft 2 is disposed vertically at the center thereof, stirring blades 3 are disposed radially at the bottom portion of the rotation shaft and the top portion of the shaft is connected to a motor 4. Numeral 5 represents a liquid medium supply port. Numeral 6 represents a deagglomerating machine and numeral 9 represents a motor. The deagglomerating machine 6 is connected to the bottom and top of the stirring tank 1 by means of transfer pipes 7 and 8, respectively. The deagglomerating machine 6 may be one which deagglomerates filler-containing PTFE powder particles contained in the liquid medium by rotating a cutter in the form of turbine blade inside the cylindrical machine while transferring the liquid medium. Examples of suitable deagglomerating machine are, for instance, a disintegrator (available from Komatsu Ltd.) and a Pipe Line Homomixer (available from Tokushu Kika Kogyo Kabushiki Kaisha) equipped with a stator and cutter for cutting and giving an impact. In order to carry out granulation by such equipment, a liquid medium containing a filler-containing PTFE powder is introduced into the stirring tank 1 through the liquid medium supply port 5, stirred with the stirring blades 3, taken out of the stirring tank 1 through the transfer pipe 7 at the bottom of the tank at the same time of the stirring or after the stirring, passed through the deagglomerating machine 6 to deagglomerate formed particles having a large particle size, and then returned to the stirring tank 1 through the transfer pipe 8. Thus the stirring and granulating in the stirring tank 1 and the deagglomeration of particles having a large particle size in the deagglomerating machine 6 are carried out at the same time, continuously or alternately to give granulates having a uniform particle size. In that case, similar granular powder can also be obtained without operating the stirring mechanism by recirculating the liquid medium and deagglomerating particles with the deagglomerating machine 6 only. The reason thereof is assumed to be because the stirring effect can be achieved by recirculating the liquid medium with the deagglomerating machine.

FIG. 2 is a diagrammatic cross-sectional view of another equipment which can be used in the preparation process of the present invention. In the stirring tank 10 are provided a deagglomerater 21 (dispersing blades) and stirring blades 12 mounted on a rotation shaft 11. Numeral 13 represents a motor for the rotation shaft 11 and numeral 22 represents a motor for the deagglomerater 21. The stirring blades 12 are mounted radially and spirally on the boss 14 at the bottom of the rotation shaft 11. Therefore in that case, while the aqueous medium in the tank is stirred with the stirring blades 12 to granulate a filler-containing PTFE powder contained in the aqueous medium, the granulated particles are deagglomerated with the deagglomerater 21.

In the present invention, it is preferable to introduce the thus-prepared slurry of filler-containing PTFE powder into the stirring tank for granulation and carry out stirring for granulation and deagglomerating. As the case demands, the filler-containing PTFE powder previously wetted with a small amount of water may be mixed with the remaining liquid medium in the stirring tank. Also it is possible to adopt a method for stirring by previously introducing a liquid medium into the stirring tank and then feeding thereto the filler-containing PTFE powder.

The slurry of filler-containing PTFE powder is granulated by an effect of stirring. At the same time of the stirring or after the granulation, large particles, for example, those having a particle size of not less than 2,000 $\mu$m are deagglomerated with the deagglomerating machine and finally formed into a powder of particles having a uniform particle size of not more than 500 $\mu$m of an average particle size without containing coarse particles having a particle size exceeding 1,000 $\mu$m.

Examples of the Preparation Processes (1) to (3) of the present invention for preparing the filler-containing PTFE granular powder are, for example, those mentioned below.
Preparation Process (1)

A ten-liter granulation tank is charged with 1 to 5 liters of ion-exchanged water, and 0.9 to 1.9 kg of a PTFE powder and then 0.075 to 0.8 kg of a filler are added thereto.

Then 4 to 200 ml of 5% aqueous solution of a nonionic surfactant is added and the mixture is stirred with dispersing blades of 100 mm diameter for 2 to 5 minutes at a stirring speed of 2,000 to 3,000 rpm. Thus the mixture becomes in the state of slurry, and the stirring is continued further for 5 to 10 minutes.

Further 450 to 1,500 ml of a liquid-liquid interface-forming organic liquid is added, and the granulation is carried out by stirring with the dispersing blades of 100 mm diameter for 1 to 2 minutes at a stirring speed of 1,000 to 2,000 rpm.

Then 0.5 to 5 liters of water is added, and the granulation was further carried out for shaping of the powder at a temperature of 10° to 30° C. at a stirring speed of 600 to 900 rpm for 0 to 30 minutes by using cone blade.

After that, the inside temperature of the granulation tank is raised up to a temperature in the range of 37.5° to 38.0° C. over 15 to 60 minutes and is kept at that temperature for 0 to 60 minutes.

This temperature keeping step and the above-mentioned mixing step with the dispersing blades immediately after the addition of the liquid-liquid interface-forming organic liquid are not conducted from the viewpoint of the separation of filler in case where the filler is, for example, glass fiber or a metal fiber or metal powder such as bronze powder, gold powder, silver powder, copper powder, stainless steel powder, stainless steel fiber, nickel powder or nickel fiber.

Then, the stirring is stopped, the granulates are separated from water by using a 150 mesh sieve and the granulates are dried in an electric oven at 165° C. for 16 hours to give the filler-containing PTFE granular powder of the present invention.

The Preparation Process (1) of the present invention can give a filler-containing PTFE granular powder which has physical properties mentioned below and provides molded products with physical properties described below. Particularly since the particle size distribution is narrow, additional steps, for example, a step of taking out particles of a small size with a sieve like a conventional method and a step of pre-mixing the PTFE powder and the filler, are not necessary. Thus, the filler-containing PTFE granular powder which cannot be prepared by a conventional process can be prepared.

(Physical Properties of Filler-containing PTFE Granular Powder)

Apparent Density: Not Less than 0.70 g/cm$^3$

When less than 0.70 g/cm$^3$, an amount of powder to be filled in a die is small.

Flowability: Not Less than 6 Times

When not more than 5.5 times, flowability in a hopper is not so good. Particularly 8 times is preferable.

Angle of Repose: Not More than 40 Degrees

The powder having an angle of repose exceeding 40 degrees is not preferable because its flowability is not good. The angle of repose is not more than 38 degrees when the apparent density is not less than 0.9 g/cm$^3$ and less than 1.0 g/cm$^3$, and is not more than 36 degrees when the apparent density is not less than 1.0 g/cm$^3$.

An angle of repose of a powder is affected by a gravity and becomes smaller as an apparent density becomes higher. Accordingly, the granular powder obtained by the granulation method of the present invention changes its angle of repose depending on its apparent density. The powders of the present invention have smaller angle of repose than that of granular powders obtained by conventional techniques.

The angle of repose of the powders obtained by the conventional techniques exceeds 40 degrees when the apparent density is not less than 0.7 g/cm$^3$ and less than 0.9 g/cm$^3$, exceeds 38 degrees when the apparent density is not less than 0.9 g/cm$^3$ and less than 1.0 g/cm$^3$ and exceeds 36 degrees when the apparent density is not less than 1.0 g/cm$^3$.

Particle Size Distribution A

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the, particle size is uniform. It is particularly preferable that the granular powder remaining on the 10 mesh and 20 mesh sieves is 0%.

Particle Size Distribution B: Not Less than 50% By Weight

The granular powder having the particle size distribution mentioned above after granulated is preferable because it is filled uniformly in the die. Particularly not less than 60% by weight is preferable.

Average Particle Size: Not More than 500 µm

When larger tan 500 µm, the powder cannot be filled in the thin-walled die. Particular preferable is from 150 to 400 µm from the viewpoint of filling the powder in the thin-walled die.

Electrostatic Charge: Not More than 50 V

A PTFE powder having an electrostatic charge exceeding 50 V adheres to not only a die but also a hopper and feeder due to static electricity at the time of molding, which results in lowering of flowability. A preferable electrostatic charge is not more than 10 V which causes no lowering of flowability at all.

(Physical Properties of Molded Article)

Tensile Strength: Not Less than 100 kgf/cm$^2$

When less than 100 kgf/cm$^2$, the molded article is inferior in mechanical strength. Preferable tensile strength is not less than 150 kgf/cm$^2$ and the tensile strength is determined depending on its application.

Elongation: 100 to 400%

When less than 100%, there is a case where the molded article is cut when mounted on an equipment or processed. Preferable elongation is not less than 150%.

Surface Roughness: Not Larger than 3.0 µm

The molded article having a surface roughness larger than 3.0 µm is not preferable because that roughness is larger than desired. Particularly preferable surface roughness is not larger than 2.0 µm.

Whiteness (Z value): Not Less than 80 (In Case of Glass Fiber)

In general preferred PTFE molded article is one having a higher whiteness. From the viewpoint of commercial value, higher whiteness is preferable.

Preparation Process (2)

A ten-liter granulation tank is charged with 1 to 5 liters of ion-exchanged water, and 0.9 to 1.9 kg of a PTFE powder is added thereto.

Then 4 to 200 ml of 5% aqueous solution of a nonionic surfactant is added and the mixture is stirred with dispersing blades of 100 mm diameter for 2 to 5 minutes at a stirring speed of 2,000 to 3,000 rpm. Thus the mixture becomes in the state of slurry.

Then 0.075 to 0.8 kg of a filler is added and the mixing is carried out with the dispersing blades of 100 mm diameter for 2 to 15 minutes at a stirring speed of 2,000 to 4,000 rpm.

The steps from a step of adding a liquid-liquid interface-forming organic liquid until the filler-containing PTFE granular powder of the present invention is obtained are the same as in the Preparation Process (1).

The Preparation Process (2) of the present invention can give a filler-containing PTFE granular powder which has physical properties mentioned below and provides molded products with physical properties described below. Particularly since the particle size distribution is narrow, additional steps, for example, a step of taking out particles of a small size with a sieve like a conventional method and a step of pre-mixing the PTFE powder and the filler, are not necessary. Thus, the filler-containing PTFE granular powder which cannot be prepared by a conventional process can be prepared.

(Physical Properties of Filler-containing PTFE Granular Powder)

Apparent Density: Not Less than 0.70 g/cm$^3$

When less than 0.70 g/cm$^3$, an amount of powder to be filled in a die is small.

Flowability: Not Less than 6 Times

When not more than 5.5 times, flowability in a hopper is not so good. Particularly 8 times is preferable.

Angle of Repose: Not More than 40 Degrees

The powder having an angle of repose exceeding 40 degrees is not preferable because its flowability is not good.

The angle of repose is not more than 38 degrees when the apparent density is not less than 0.9 g/cm$^3$ and less than 1.0 g/cm$^3$, and is not more than 36 degrees when the apparent density is not less than 1.0 g/cm$^3$.

Particle Size Distribution A

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle Size Distribution B: Not Less than 50% by Weight

The granular powder having the particle size distribution mentioned above after granulated is preferable because it is filled uniformly in the die. Particularly not less than 60% by weight is preferable.

Average Particle Size: Not More than 500 μm

When larger than 500 μm, the powder cannot be filled in the thin-walled die. Particularly preferable is from 150 to 400 μm from the viewpoint of filling the powder in the thin-walled die.

Electrostatic Charge: Not More than 50 V

A PTFE powder having an electrostatic charge exceeding 50 V adheres to not only a die but also a hopper and feeder due to static electricity at the time of molding, which results in lowering of flowability. A preferable electrostatic charge is not more than 10 V which causes no lowering of flowability at all.

(Physical Properties of Molded Article)

Tensile Strength: Not Less than 100 kgf/cm$^2$

When less than 100 kgf/cm$^2$, the molded article is inferior in mechanical strength. Preferable tensile strength is not less than 150 kgf/cm$^2$ and the tensile strength is determined depending on its application.

Elongation: 100 to 400%

When less than 100%, there is a case where the molded article is cut when mounted on an equipment or processed. Preferable elongation is not less than 150%.

Surface Roughness: Not Larger than 3.0 μm

The molded article having a surface roughness larger than 3.0 μm is not preferable because that roughness is larger than desired. Particularly preferable surface roughness is not larger than 2.0 μm.

Whiteness (Z Value): Not Less than 80 (In Case of Glass Fiber)

In general preferred PTFE molded article is one having a higher whiteness. From the viewpoint of commercial value, higher whiteness is preferable.

Preparation Process (3)

A PTFE powder having an average particle size of 2 to 3 mm and taken out of the polymerization system in usual suspension polymerization method is pre-pulverized by means of a Pipe Line Homomixer to give a water-containing PTFE powder having an average particle size of 200 to 1,000 μm and a water content of 5 to 30% by weight.

The obtained water-containing PTFE powder is poured in the JIYU mill mentioned above and wet-pulverized under the conditions of motor power of 2.2 kW and a capacity of 1.0 to 100 kg/hr by using a screen having plural holes of 0.1 to 0.3 mm diameter as a perforated panel, and thus, a powder having an average particle size of 20 to 100 μm and a water content of 5 to 30% is obtained. The steps from a step of adding the obtained powder of 1.575 to 2.6 kg to the ion-exchanged water until the filler-containing PTFE granular powder of the present invention is obtained are the same as in Preparation Process (2).

The Preparation Process (3) of the present invention can give a filler-containing PTFE granular powder which has physical properties mentioned below and provides molded products with physical properties described below. Particularly since the particle size distribution is narrow, additional steps, for example, a step of taking out particles of a small size with a sieve like a conventional method and a step of pre-mixing the PTFE powder and the filler, are not necessary. Thus, the filler-containing PTFE granular powder which cannot be prepared by a conventional process can be prepared.

(Physical Properties of Filler-containing PTFE Granular Powder)

Apparent Density: Not Less than 0.70 g/cm$^3$

When less than 0.70 g/cm$^3$, an amount of powder to be filled in a die is small.

Flowability: Not Less than 6 Times

When not more than 5.5 times, flowability in a hopper is not so good. Particularly 8 times is preferable.

Angle of Repose: Not More than 40 Degrees

The powder having an angle of repose exceeding 40 degrees is not preferable because its flowability is not good.

The angle of repose is not more than 38 degrees when the apparent density is not less than 0.9 g/cm$^3$ and less than 1.0 g/cm$^3$, and is not more than 36 degrees when the apparent density is not less than 1.0 g/cm$^3$.

Particle Size Distribution A

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle Size Distribution B: Not Less than 50% by Weight

The granular powder having the particle size distribution mentioned above after granulated is preferable because it is filled uniformly in the die. Particularly not less than 60% by weight is preferable.

Average Particle Size: Not More than 500 μm

When larger than 500 μm, the powder cannot be filled in the thin-walled die. Particularly preferable is from 150 to 400 μm from the viewpoint of filling the powder in the thin-walled die.

(Physical Properties of Molded Article)

Tensile Strength: Not Less than 100 kgf/cm$^2$

When less than 100 kgf/cm$^2$, the molded article is inferior in mechanical strength. Preferable tensile strength is not less than 150 kgf/cm² and the tensile strength is determined depending on its application.
Elongation: 100 to 400%
When less than 100%, there is a case where the molded article is cut when mounted on an equipment or processed. Preferable elongation is not less than 150%.
Surface Roughness: Not Larger than 3.0 μm
The molded article having a surface roughness larger than 3.0 μm is not preferable because that roughness is larger than desired. Particularly preferable surface roughness is not larger than 2.0 μm.
Whiteness (Z Value): Not Less than 80 (In Case of Glass Fiber)
In general preferred PTFE molded article is one having a higher whiteness. From the viewpoint of commercial value, higher whiteness is preferable.
The preferred conditions for preparing the filler-containing PTFE granular powder of the present invention are, for example, as follows:
(1) (A) PTFE powder 100 parts
(B) Filler 2.5 to 100 parts
(C) A specific nonionic surfactant 0.01 to 5%
    (on the basis of the sum of (A) and (B))
(D) Liquid-liquid interface-forming 30 to 80% organic liquid
    (on the basis of the sum of (A) and (B))
Order of addition:
(A)→(B)→(C)→(in the state of slurry)→(D)
More preferable are the conditions mentioned below.
(A) PTFE powder 100 parts
(B1) Glass fiber 5 to 30 parts
(C) A specific nonionic surfactant 0.1 to 1%
    (on the basis of the sum of (A) and (B1))
(D1) Halogenated hydrocarbon 40 to 60%
    (on the basis of the sum of (A) and (B1))
Order of addition:
(A)→(B1)→(C)→(in the state of slurry)→(D1)
(2) (A) PTFE powder 100 parts
(B) Filler 2.5 to 100 parts
(C) A specific nonionic surfactant 0.01 to 1%
    (on the basis of the sum of (A) and (B))
(D) Liquid-liquid interface-forming 30 to 80% organic liquid
    (on the basis of the sum of (A) and (B))
Order of addition:
(A)→(C)→(in the state of slurry)→(B)→(D)
More preferable are the conditions mentioned below.
(A) PTFE powder 100 parts
(B1) Glass fiber 5 to 30 parts
(C) A specific nonionic surfactant 0.1 to 0.3%
    (on the basis of the sum of (A) and (B1))
(D1) Halogenated hydrocarbon 40 to 60%
    (on the basis of the sum of (A) and (B1))
Order of addition:
(A)→(C)→(in the state of slurry)→(B1)→(D1)
(3) (A1) Water-containing PTFE powder 100 parts
    (water content: 5 to 30%)
(B) Filler 2.5 to 100 parts
(C) A specific nonionic surfactant 0.01 to 1%
    (on the basis of the sum of (A1) and (B))
(D) Liquid-liquid interface-forming 30 to 80% organic liquid
    (on the basis of the sum of (A1) and (B))
Order of addition:
(A1)→(C)→(in the state of slurry)→(B)→(D)
More preferable are the conditions mentioned below.
(A1) Water-containing PTFE powder 100 parts
    (water content: 5 to 30%)
(B1) Glass fiber 3 to 30 parts
(C) A specific nonionic surfactant 0.1 to 0.3%
    (on the basis of the sum of (A1) and (B1))
(D1) Halogenated hydrocarbon 40 to 60%
    (on the basis of the sum of (A1) and (B1))
Order of addition:
(A1)→(C)→(in the state of slurry)→(B1)→(D1)
The present invention is then explained by means of Examples, but is not limited thereto.

EXAMPLE 1

Preparation Process (1)

A ten-liter granulation tank was charged with 1.5 liters of ion-exchanged water, followed by the addition, by turns, of 1.275 kg (dry basis) of a PTFE powder (POLYFLON M-12 available from DAIKIN INDUSTRIES, LTD., PTFE homopolymer) having an average particle size of 31 μm after the pulverization and 0.225 kg of glass fibers (EPG40M-10A available from Nippon Denki Glass Kabushiki Kaisha, average diameter: 12 μm, average fiber length: 80 μm) which had been subjected to water-repellent-treatment previously with an aminosilane coupling agent.

Then, 90 ml of 5% by weight aqueous solution of an ethylene oxide block polymer of propylene glycol (a molecular weight of polyoxypropylene segment: 1,000, a molecular weight of polyoxyethylene segment: 667, Puronon #104 available from NOF Corporation) was added as a specific nonionic surfactant.

Subsequently the stirring was carried out with dispersing blades of 100 mm diameter at a stirring speed of 3,000 rpm for two minutes, and the PTFE powder and the filler got wet with water and became in the state of viscous slurry having a viscosity of 10 to 1,000 cps, followed by mixing with stirring for three minutes in that state.

Then, 750 ml of a liquid-liquid interface-forming organic liquid (methylene chloride) was added. And, granulation was carried out at a stirring speed of 1,500 to 2,000 rpm for 1 to 2 minutes by using dispersing blades of 100 mm diameter.

Then 4.5 liters of water was added, and the granulation was further carried out, for shaping of the granular powder, at 25° C.±2° C. for 15 minutes under stirring at 800 rpm by using cone blade.

Subsequently, the stirring was stopped when the temperature in the tank was raised up to 38° C. over 20 minutes. The granulates were separated from water by using a 150 mesh sieve and dried in an electric oven at 165° C. for 16 hours to obtain a filler-containing PTFE granular powder of the present invention, and the following tests were carried out.
Apparent density: Measured in accordance with JIS K 6891-5.3
Average Particle Size After Pulverization (Primary Particle Size)

Wet sieve method: JIS standard sieves of 20 mesh (sieve opening: 840 μm), 250 mesh (sieve opening: 62 μm), 270 mesh (sieve opening: 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m² for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated weight percentages 50($d_{50}$) and 84($d_{34}$) are read, and wet sieve size ($d_{WS}$) is calculated by the following equation.

$$\log_e d_{ws} = \log_e d_{50} - \frac{1}{2}\left(\log_e \frac{d_{34}}{d_{50}}\right)^2$$

Flowability: Measured in accordance with the method described in JP-A-3-259925.

Figure 3:
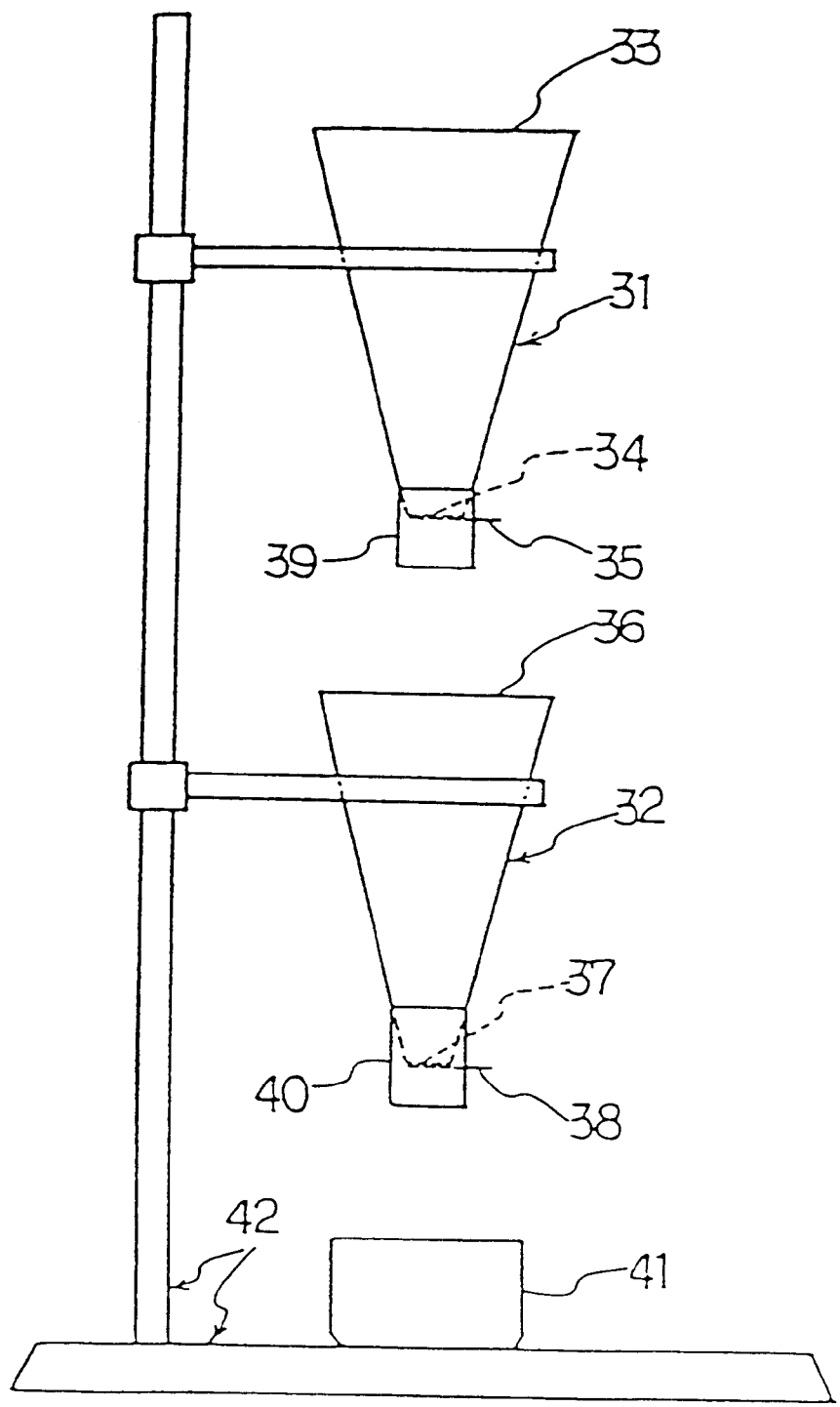
FIG. 3 is a diagrammatic view of an apparatus used for determining flowability of the granular powder in the present invention.

Namely, there is used a measuring device comprising a support base 42 and an upper hopper 31 and a lower hopper 32, the both of which are aligned on their center lines and supported on the support base 42 as shown in FIG. 3 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 3, the numerals 39 and 40 indicate outlet covers of each hopper, and the numeral 41 indicates a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether the powder is dropped or not from the outlet 37. When the powder is dropped completely within eight seconds, the powder is estimated to have been dropped as required.

(II) The same steps as above are repeated three times to see if the powder is dropped as required, In case where the powder is dropped satisfactorily twice or more, the flowability of the powder is estimated to be "Good". In case where the powder is never dropped, the flowability of the powder is estimated to be "Not good". In case where in three series of the dropping test, the powder has been dropped only one time, the dropping test is further conducted twice, and when the two series of the dropping test are both satisfactory, the flowability is estimated to be "Good". In other cases, the flowability is estimated to be "Not good".

(III) With respect to the powder estimated to be "Good", the upper hopper is charged with two cups of powder by using the same 30 cc cup, and the dropping test of the powder is conducted in the same manner as above. When as a result, the flowability is estimated to be "Good", the number of cups filled with the powder is increased successively and the dropping test is continued until the flowability is estimated to be "Not good". The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average Particle Size and Particle Size Distribution A of Granular Powder

Standard sieves of 10, 20, 32, 48, 60 and 83 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size.

Particle Size Distribution B

The particle size distribution B is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Tensile Strength (Hereinafter May Be Referred to as "TS") and Elongation (Hereinafter May Be Referred to as "EL")

A die having an inner diameter of 100 mm is charged with 25 g of powder, and a pressure is applied gradually over about 30 seconds until the final pressure becomes about 500 kg/cm$^2$. Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-5.8 by stretching at a stretching rate of 200 mm/min with an autograph having a gross weight of 500 kg.

Angle of Repose

Measured with Powder Tester available from Hosokawa Micron Co., Ltd.

Electrostatic Charge

Handy Electrostatic Meter SFM775 available from Ion Systems, Inc. is used to determine an electrostatic charge.

Whiteness (Z Value)

A 50 mm diameter die was filled with 200 g of a granular powder which was then maintained at a molding pressure of 500 kg/cm$^2$ for five minutes. The obtained pre-molded article (diameter: about 50 mm, height: about 50 mm) was heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (at the center of its height). Then the Z value on the center of the cut portion was measured through Z value measuring method of the XYZ calorimetric system of Commission International de Leclairage.

Surface Roughness

A 50 mm diameter die mold was charged with 210 g of powders and maintained for five minutes at a molding pressure of 500 kg/cm$^2$. The obtained pre-molded article was heated up from room temperature to 365° C. at a heating rate of 50° C./hr. After maintained at 365° C. for 5.5 hours, the pre-molded article was cooled at a cooling rate of 50° C./hr. The top surface of the obtained molded article was measured according to the center line average roughness (Ra) method described in JIS B 0601 by using a surface roughness measuring device available from Tokyo Seimitsu Kikai Kabushiki Kaisha.

With respect to the filler-containing PTFE granular powder obtained in Example 1, the photographs of the particles in the powder were taken in the following way.

Shape of particle

By using a Video Microscope of optical microscope available from SONY Corporation, photographs were taken at 100 magnifications and 200 magnifications.

Figure 4:
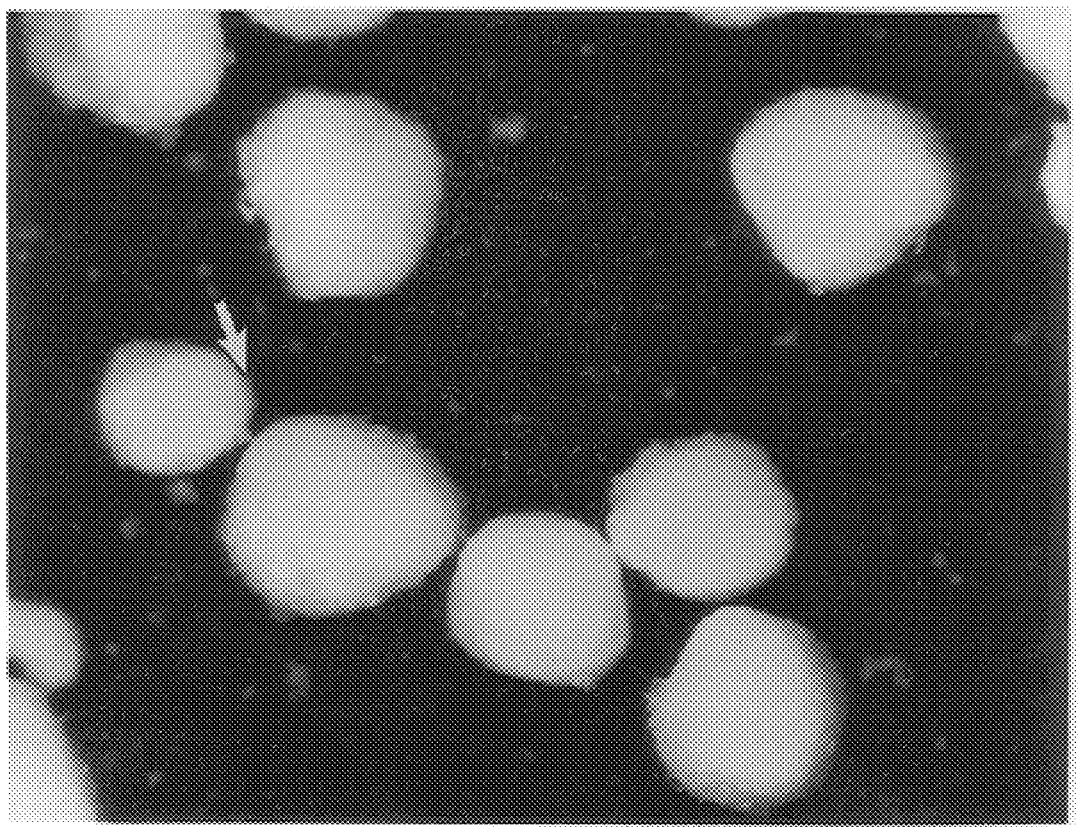
FIG. 4 is an optical microscopic photograph (magnification:×100) showing a structure of particles in the filler-containing PTFE granular powder of the present invention, which was obtained in Example 1.
Figure 5:
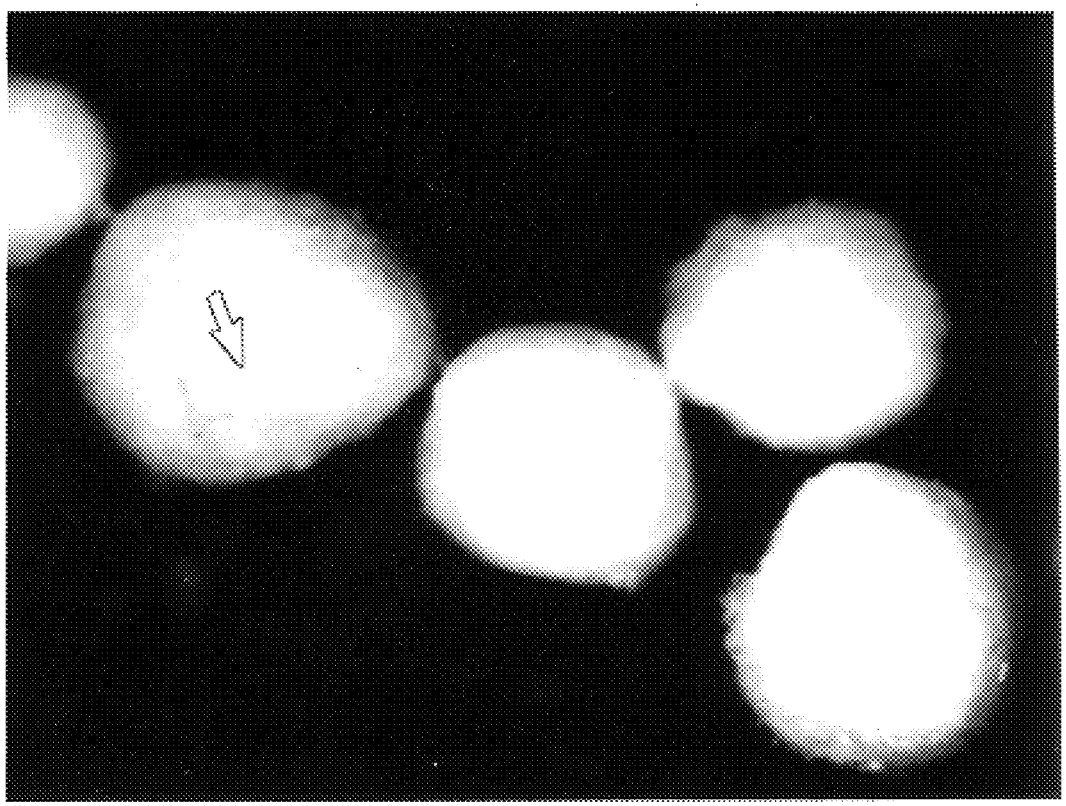
FIG. 5 is an optical microscopic photograph (magnification:×200) showing a structure of particles in the filler-containing PTFE granular powder of the present invention, which was obtained in Example 1.

The results are shown in Table 1, FIG. 4 (×100) and FIG. 5 (×200).

EXAMPLES 2 and 3

A filler-containing PTFE powder was prepared in the same manner as in Example 1 except that an amount of the specific nonionic surfactant used was changed to that shown in Table 1. Various physical properties were determined in the same manner as in Example 1. The results are shown in Table 1.

EXAMPLE 4

Preparation Process 2

A ten-liter granulation tank was charged with 1.5 liters of ion-exchanged water, and 1.275 kg (dry basis) of a pulverized PTFE powder (POLYFLON M-12 available from DAIKIN INDUSTRIES, LTD., PTFE homopolymer) having an average particle size of 31 µm.

Then, 90 ml of a 5% aqueous solution of ethylene oxide block polymer of polypropylene glycol (Puronon #104) was added as a specific nonionic surfactant.

Subsequently the stirring was carried out with dispersing blades of 100 mm diameter at a stirring speed of 3,000 rpm for two minutes, and the PTFE powder got wet with water and became in the state of viscous slurry having a viscosity of 10 to 1,000 cps.

Further 0.225 kg of glass fibers (the same as those of Example 1) which had been subjected to water-repellent-treatment previously with an aminosilane coupling agent was added, and the stirring was carried out with dispersing blades of 100 mm diameter at a stirring speed of 3,000 rpm for two minutes, and the glass fibers also got wet with water and the mixture became in the state of viscous slurry having a viscosity of 10 to 1,000 cps. In that state, mixing was carried out by further stirring for three minutes.

Then 750 ml of a liquid-liquid interface-forming organic liquid (methylene chloride) was added. And, granulation was carried out by stirring with dispersing blades of 100 mm diameter at a stirring speed of 1,500 to 2,000 rpm for 1 to 2 minutes.

Then 4.5 liters of water was added, and the granulation was further carried out, for shaping of the granular powder, at 25° C.±2° C. for 15 minutes under stirring at 800 rpm by using cone blade.

Subsequently, the temperature in the tank was raised up to 38° C. over 20 minutes, and then the stirring was stopped. The granulates were separated from water by using a 150 mesh sieve and dried in an electric oven at 165° C. for 16 hours to obtain a filler-containing PTFE granular powder of the present invention. The same tests as in Example 1 were carried. The results are shown in Table 1.

Figure 6:
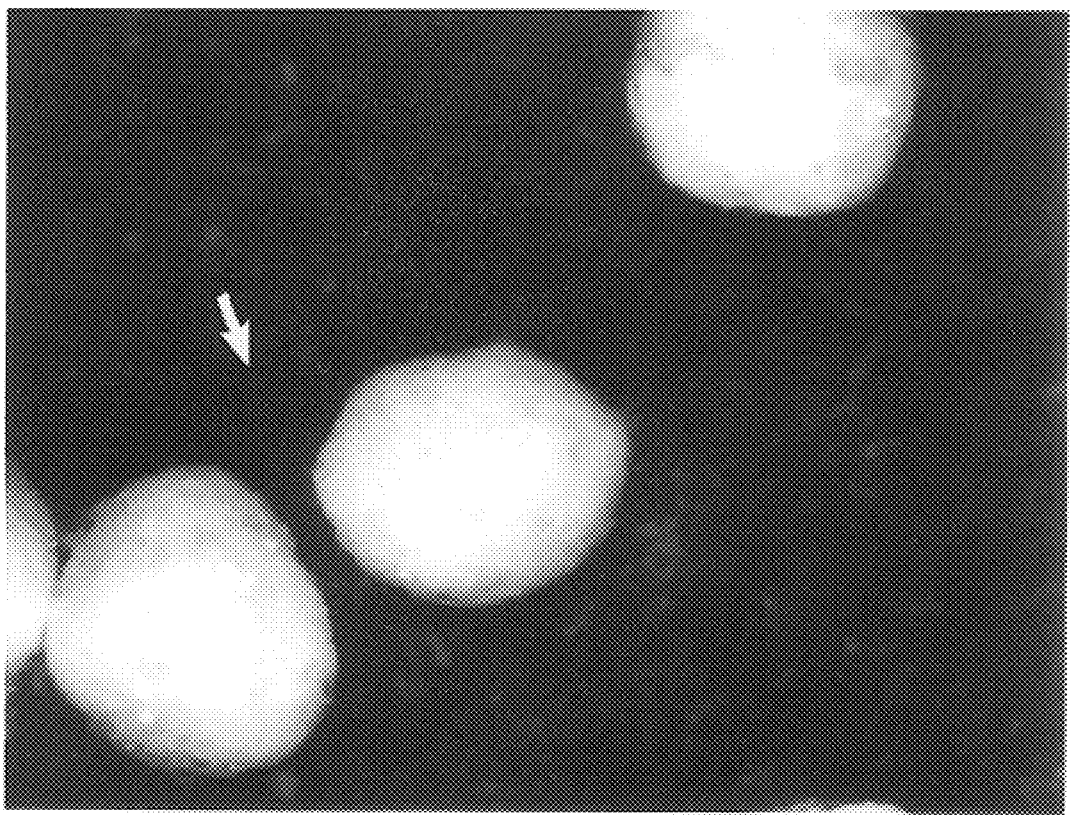
FIG. 6 is an optical microscopic photograph (magnification:×200) showing a structure of particles in the filler-containing PTFE granular powder of the present invention, which was obtained in Example 4.

The obtained filler-containing PTFE powder was observed with a microscope in the same manner as in Example 1 and its photograph was taken. The photograph is shown in FIG. 6.

EXAMPLE 5

Preparation Process 3

A 2,000-liter stainless steel autoclave equipped with a stirrer was charged with 1,600 liters of deoxidized pure water, and air inside the autoclave was replaced by nitrogen gas and then by tetrafluoroethylene. Then while keeping the inside temperature at 10° C., pressurized tetrafluoroethylene gas was fed in the autoclave until its inside pressure became 6 atm, and $(NH_4)_2S_2O_2$ and $FeSO_4$ were added as a polymerization initiator. Thus polymerization of tetrafluoroethylene was carried out with stirring. Since the inside pressure lowered as the polymerization advanced, tetrafluoroethylene was added continuously so that the inside pressure would be kept at 6 atm. Four hours after, the stirring was stopped, tetrafluoroethylene was recovered and then a product in the autoclave was taken out. The produced polymer which comprises PTFE coarse particles having an average particle size of 2 to 3 mm was pre-pulverized by means of T.K. Pipe Line Homomixer model 2S (available from Tokushu Kika Kogyo Kabushiki Kaisha) to give a pre-pulverized PTFE powder having an average particle size of about 400 µm.

The obtained pre-pulverized PTFE powder was poured, without being dried, into a JIYU mill model M-2 (available from Nara Kikai Kabushiki Kaisha) with about 25% by weight of water being contained therein, followed by wet-pulverizing. The wet-pulverizing was carried out by using a screen having plural holes of 0.25 mm diameter as a perforated panel for classification at a motor power of 2.2 kW and a treating capacity of 38 kg/hr to give a PTFE powder having an average particle size of 36 µm.

A 10-liter granulation tank was charged with 1.5 liters of ion-exchanged water and 1.275 kg (dry basis) of the wet-pulverized PTFE powder having an average particle size of 36 µm.

Then, 90 ml of a 5% aqueous solution of ethylene oxide block polymer of polypropylene glycol (Puronon #104) was added as a specific nonionic surfactant.

Subsequently the stirring was carried out with dispersing blades of 100 mm diameter at a stirring speed of 3,000 rpm for two minutes, and the PTFE powder got wet with water and became in the state of viscous slurry having a viscosity of 10 to 1,000 cps.

Further 0.225 kg of glass fibers (the same as those of Example 1) which had been subjected to water-repellent-treatment previously with an aminosilane coupling agent was added, and the stirring was carried out with dispersing blades of 100 mm diameter at a stirring speed of 3,000 rpm for two minutes, and the glass fibers also got wet with water and the mixture became in the state of viscous slurry having a viscosity of 10 to 1,000 cps. In that state, mixing was carried out by further stirring for three minutes.

Then 750 ml of a liquid-liquid interface-forming organic liquid (methylene chloride) was added. And, granulation was carried out with dispersing blades of 100 mm diameter at a stirring speed of 1,500 to 2,000 rpm for 1 to 2 minutes.

Then 4.5 liters of water was added, and the granulation was further carried out, for shaping of the granular powder, at 25° C.±2° C. for 15 minutes under stirring at 800 rpm by using cone blade.

Subsequently, the temperature in the tank was raised up to 38° C. over 20 minutes, and then the stirring was stopped. The granulates were separated from water by using a 150 mesh sieve and dried in an electric oven at 165° C. for 16 hours to obtain a filler-containing PTFE granular powder of the present invention. The same tests as in Example 1 were carried out. The results are shown in Table 1.

Figure 7:
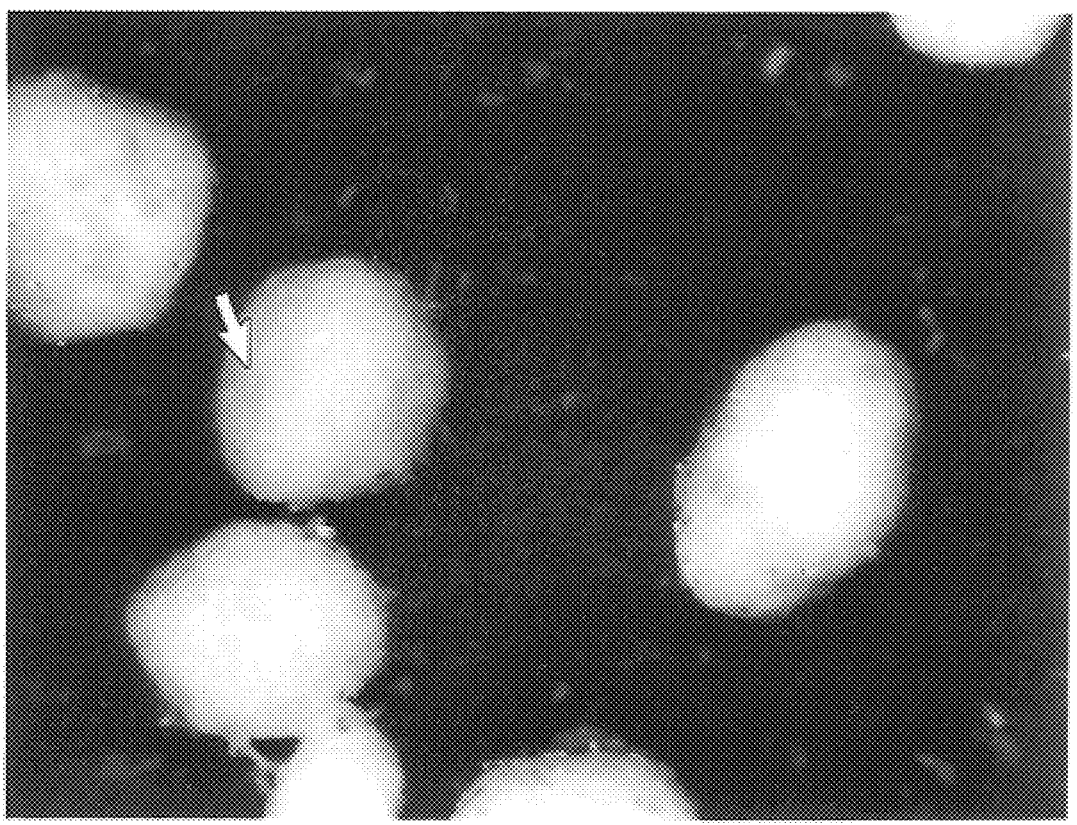
FIG. 7 is an optical microscopic photograph (magnification:×200) showing a structure of particles in the filler-containing PTFE granular powder which was obtained in Comparative Example 5.

The obtained filler-containing PTFE powder was observed with a microscope in the same manner as in Example 1 and its photograph was taken. The photograph is shown in FIG. 7.

TABLE 1

|  | Ex. 1 | Ex. 2 | Ex. 3 | Ex. 4 | Ex. 5 |
|---|---|---|---|---|---|
| Conditions for preparation |  |  |  |  |  |
| Surfactant (kind) | Puronon #104 | Puronon #104 | Puronon #104 | Puronon #104 | Puronon #104 |
| Surfactant (% by weight) | 0.2 | 0.5 | 1.0 | 1.0 | 1.0 |
| Liquid-liquid interface-forming organic solvent (kg) | 1.0 | 1.0 | 1.0 | 1.0 | 1.0 |
| Physical properties of granular powder |  |  |  |  |  |
| Apparent density (g/cm$^3$) | 0.88 | 0.85 | 0.83 | 0.84 | 0.83 |
| Flowability | 8.0 | 8.0 | 8.0 | 8.0 | 8.0 |
| Angle of repose (degree) | 36 | 36 | 35 | 35 | 35 |
| Electrostatic charge (V) | 10 | 3 | 2 | 2 | 1 |
| Particle size distribution A (% by weight) |  |  |  |  |  |
| 10 on | 0.0 | 0.0 | 0.0 | 0.0 | 0.0 |
| 20 on | 0.0 | 0.0 | 0.0 | 0.0 | 2.0 |
| 32 on | 29.8 | 16.9 | 4.0 | 3.4 | 3.8 |
| 48 on | 59.4 | 65.0 | 63.6 | 61.9 | 61.7 |
| 60 on | 7.2 | 11.9 | 19.8 | 20.0 | 20.3 |
| 83 on | 3.2 | 5.4 | 11.6 | 12.3 | 12.5 |
| 83 pass | 0.4 | 0.8 | 1.0 | 1.6 | 1.6 |
| Particle size distribution B (% by weight) | 63.3 | 70.7 | 71.0 | 69.2 | 68.7 |
| Average particle size after granulation (μm) | 430 | 400 | 350 | 340 | 350 |
| Physical properties of molded article |  |  |  |  |  |
| TS (kg/cm$^2$G) | 215 | 213 | 215 | 214 | 215 |
| EL (%) | 283 | 285 | 281 | 283 | 282 |
| Surface roughness (μm) | 2.76 | 2.55 | 2.45 | 2.44 | 2.45 |
| Whiteness (Z value) | 93 | 92 | 91 | 92 | 91 |

In the column of the particle size distribution A of Table 1, 10 on, 20 on, 32 on, 48 on, 60 on and 83 on indicate the percentages of particles remaining on the 10 mesh, 20 mesh, 32 mesh, 48 mesh, 60 mesh and 83 mesh sieves, respectively. And, 83 pass represent the percentage of the particles passed through the 83 mesh sieve.

As is evident from the results in Table 1, the filler-containing PTFE granular powder obtained by any of the preparation processes of the present invention has a large apparent density, particularly a small particle size, a narrow particle size distribution, a small electrostatic charge and a superior flowability in spite of the small particle size. Also, the molded article obtained from the granular powder is superior in tensile strength and elongation and the surface roughness thereof is low.

Also, it is recognized that the preparation processes of the present invention can control the average particle size and particle size distribution of the filler-containing PTFE granular powder by an addition amount of the specific surfactant.

Also when a white or transparent filler is used, a whiteness (Z value) of the obtained molded article is not less than 80, further not less than 95 which is higher than that of a molded article obtained by a conventional preparation process.

FIGS. 4 and 5 are optical microscopic photographs of Example 1 and FIGS. 6 and 7 are optical microscopic photographs of Examples 4 and 5, respectively, which show the structure of the particle in the filler-containing PTFE granular powders of the present invention. As is evident from these figures (photographs), it is known that the particles in the filler-containing PTFE granular powder of the present invention are almost spherical.

The reason why the filler-containing PTFE granular powder of the present invention is superior in powder flowability in spite of the small average particle size seems that, for example, the shape of the particles are almost spherical as mentioned above.

INDUSTRIAL APPLICABILITY

The filler-containing PTFE granular powder of the present invention which contains the almost spherical particles in its major portion has a large apparent density, a small average particle size, a narrow particle size distribution and a small electrostatic charge and is superior in powder flowability in spite of the small particle size. And, the molded product obtained from the granular powder is superior in tensile strength and elongation and has a low surface roughness and a high whiteness.

Also, the Preparation Processes (1) to (3) of the present invention can provide the filler-containing PTFE granular powder having superior physical properties as mentioned above and, particularly, can control the average particle size and particle size distribution by the amount of the specific surfactant, and can give the granular powder having a narrow particle size distribution.

What is claimed is:

1. A filler-containing polytetrafluoroethylene granular powder which has an apparent density of not lower than 0.7 g/cm$^3$, a powder flowability of not less than 6 times, an electrostatic charge of not more than 50 V and an angle of repose of not larger than 40 degrees, obtained by a process for preparing a filler-containing polytetrafluoroethylene granular powder by granulation, in water with stirring, of a polytetrafluoroethylene powder prepared by suspension polymerization and a filler; characterized in that the powder and filler are poured in water separately without being pre-mixed, are mixed with stirring in the presence of a nonionic surfactant having a hydrophobic segment comprising a poly(oxyalkylene) unit having 3 or 4 carbon atoms and a hydrophilic segment comprising a poly(oxyethylene) unit to give a slurry, and then are granulated with stirring in the presence of an organic liquid which forms liquid-liquid interface with water.

2. The filler-containing polytetrafluoroethylene granular powder of claim 1, which has an average particle size of not more than 500 μm.

3. A filler-containing polytetrafluoroethylene granular powder having an apparent density of not lower than 0.7 g/cm$^3$, an angle of repose of not larger than 40 degrees, an electrostatic charge of not more than 50 V and an average particle size of not more than 500 µm.

4. The filler-containing polytetrafluoroethylene granular powder of claim 3, which comprises 2.5 to 50% by weight of the filler.

5. The filler-containing polytetrafluoroethylene granular powder of claim 3, which provides a molded article having a surface roughness of not larger than 3.0 µm.

6. The filler-containing polytetrafluoroethylene granular powder of claim 3, wherein the granular powder has a particle size distribution that the granular particles remaining on a 10 mesh sieve is 0% and granular particles remaining on a 20 mesh sieve is not larger than 5%.

7. The filler-containing polytetrafluoroethylene granular powder of claim 3, wherein a proportion of the particles in the granular powder having a particle size of 0.7 to 1.3 times the average particle size is not less than 50% by weight on the basis of the whole particles.

8. The filler-containing polytetrafluoroethylene granular powder of claim 3, wherein the filler is a white or transparent filler.

9. The filler-containing polytetrafluoroethylene granular powder of claim 8, which provides a molded article having whiteness (Z value) of not less than 80.

10. A filler-containing polytetrafluoroethylene granular powder which has an apparent density of not lower than 0.7 g/cm$^3$, a powder flowability of not less than 6 times, an electrostatic charge of not more than 50 V and an angle of repose of not larger than 40 degrees, obtained by a process for preparing a filler-containing polytetrafluoroethylene granular powder by granulation, in water with stirring, of a polytetrafluoroethylene powder prepared by suspension polymerization and a filler; characterized in that the powder is poured in water and stirred in the presence of a nonionic surfactant having it hydrophobic segment comprising a poly(oxyalkylene) unit having 3 or 4 carbon atoms and a hydrophilic segment comprising a poly(oxyethylene) unit to give a slurry, and then after the filler is added and mixed to the slurry, the mixture is granulated with stirring in the presence of an organic liquid which forms liquid-liquid interface with water.

11. The filler-containing polytetrafluoroethylene granular power of claim 10, which has an average particle size of not more than 500 µm.

* * * * *